United States Patent [19]

Callewaert

[11] Patent Number: 5,697,705
[45] Date of Patent: Dec. 16, 1997

[54] METHOD FOR TESTING A HEAT SOURCE

[75] Inventor: Dennis J. Callewaert, Troy, Mich.

[73] Assignee: Test Products, Inc., Sterling Heights, Mich.

[21] Appl. No.: 457,829

[22] Filed: Jun. 1, 1995

Related U.S. Application Data

[62] Division of Ser. No. 194,048, Feb. 9, 1994, Pat. No. 5,542,764.

[51] Int. Cl.$^6$ .............................. G01J 5/00; G01N 25/00
[52] U.S. Cl. .................... 374/45; 374/129; 374/124; 374/141; 219/494; 392/416
[58] Field of Search ................... 374/45, 141, 129, 374/133, 124; 219/412, 413, 494; 392/416

[56] References Cited

U.S. PATENT DOCUMENTS

| | | | |
|---|---|---|---|
| 4,175,418 | 11/1979 | Steffen et al. | 374/143 |
| 4,316,175 | 2/1982 | Korber et al. | 374/112 |
| 4,352,290 | 10/1982 | Neils | 374/110 |
| 4,722,612 | 2/1988 | Junkert et al. | 374/133 |
| 4,760,371 | 7/1988 | Don | 374/121 |
| 4,870,252 | 9/1989 | Balmer | 374/28 |

*Primary Examiner*—Diego F. F. Gutierrez
*Attorney, Agent, or Firm*—Dykema Gossett PLLC

[57] ABSTRACT

A thermal difference detector for testing serviceability of a heat source includes a sensor connected via sn amplifier-filter to a microprocessor outputting an indicator. The inventive detector can be used in a system for testing the serviceability of a plurality of heat sources. The system comprises a plurality of detectors, a robotic structure, with the detectors mounted on arms of the structure, a microprocessor and an indicator unit. A method is also disclosed comprising a sequence of steps including detecting radiation from an ambient temperature source, detecting radiation from the heat source, transforming them into electrical signals and processing the signals, comparing them to each other, and making a judgement of the serviceability of the heat source based on a predetermined criteria.

5 Claims, 3 Drawing Sheets

METHOD FOR TESTING A HEAT SOURCE

This is a divisional of application Ser. No. 08/194,048 filed on Feb. 9, 1994, now U.S. Pat. No. 5,542,764.

FIELD OF THE INVENTION

This invention relates generally to a heat sensitive device, a method of testing object serviceability with the use of such device, and an equipment functionality control system. More particularly, though not exclusively, this invention relates to testing the serviceability of vehicle heat radiating devices, such as lights, heated mirrors, windshields and rear windows.

SUMMARY OF THE INVENTION

It is an object of this invention to provide a new, effective and relatively cheap device for detecting a difference in temperatures of an item of interest, which difference is then processed for evaluating the functionality of the item.

To meet this object, a thermal difference detector is provided comprising a sensor means, a processing means, and an indicator means. The sensor means is preferably adapted to be trained on a source of thermal radiation and responsive to such radiation to transform a temperature of the source into an electric parameter, an analog amount of the parameter being correlated with the temperature. The processing means is coupled with the sensor means and adapted to sample and digitized instantaneous values of the analog amount, and then to compare the digitized values with previously written in and stored data characterising an ambient temperature. The indicator means is preferably coupled with the processing means to display a result of the comparison, the result serving as a measure of an extent of the source being warmed up, to thereby evidence whether the source functions properly.

Another object of the invention is to provide a non contact testing system that can be effectively used for an evaluation of serviceability of a plurality of sources producing heat radiation, With this object in view, this invention includes a system comprising thermal difference detectors; a robotic structure having a number of arms preferably equal to the number of detectors, with each detector being mounted on a respective one of the arms. A processor means for controlling the robotic structure to put each arm in a position for sensing heat radiation from a respective source is also provided. The processor means is coupled rich the detectors to make independent comparison of a signal corresponding to an ambient temperature with signals produced by the detectors, each of the signals characterising a measure of heat emanated from a respective one of the sources. An indicator means for displaying results of the comparison is provided, to thus judge the functionality of the heat producing sources.

A method associated with this invention facilitates testing serviceability of at least one source of heat using at least one infrared thermal detector. The inventive method includes the steps of determining an ambient temperature using the detector; processing a first electrical signal corresponding to the ambient temperature and storing it; activating the source of heat pointing the thermal detector at the source of heat; determining a magnitude of a second electrical signal corresponding to the temperature of the source; comparing the first signal with the second signal to thereby determine the serviceability of the source.

These and other objects and advantages of the present invention will be clearly understood from the ensuing detailed description in connection with the accompanying drawings.

DETAILED DESCRIPTION OF THE PREFERRED EMBODIMENTS

Figure 1:
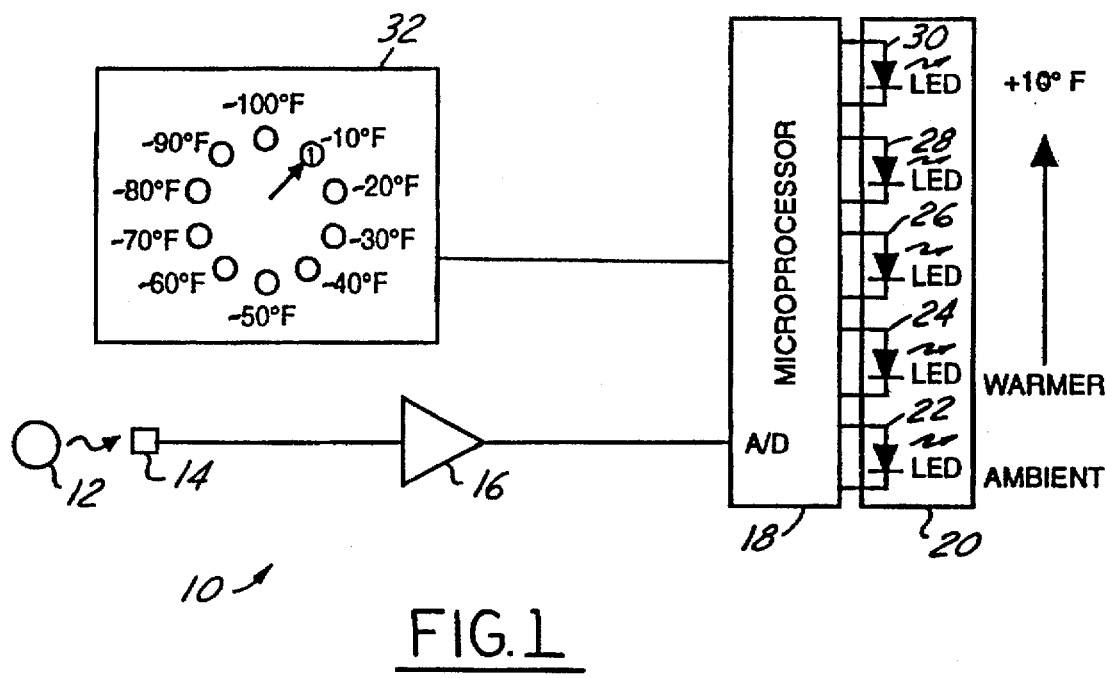
FIG. 1 is a schematic view of a detector designed according to the present invention.

Referring now to the drawings, and more specifically to FIG. 1, a detector 10 of heat radiation, emanating from a heat source 12, includes a sensor 14 for detecting heat radiation, an amplifier-filter 16 coupled with sensor 14, a microprocessor 18 receiving signals from amplifier-filter 16, an indicator 20 comprising a number of light emitting diodes 22–30, and a temperature range switch 32.

Any source of heat produces infrared radiation. An infrared sensor is needed to detect such radiation. The sensor transforms infrared radiation into a proportional analog voltage which is then supplied to amplifier-filter 16. An output analog signal of amplifier-filter 16 is input into microprocessor 18. To be set forth by and large, the problems presented to microprocessor 18 involve sampling and digitizing the instantaneous values of the voltage produced by the sensor, taking a reading of the voltage, storing the result of the reading, taking another reading of a different voltage offered by the sensor, comparing the results of the previous and subsequent readings with the stored value, and outputting them to be displayed. It is appreciated that these operations can be accomplished within microprocessor 18 using conventional software techniques.

The use of a device designed in accordance with this invention is described as follows. Sensor 14 is preferably pointed at an ambient temperature source, microprocessor 18 is input by the voltage value corresponding to this ambient temperature. The value is digitized and sent to the microprocessor's memory. Prior to the digitizing, a reset button (not shown) is preferably pressed to bring the microprocessor's circuits into an initial state.

Then, sensor 14 is aimed at heat source 12 having a temperature presupposedly higher than the ambient one. The corresponding magnitude of voltage output by the sensor is supplied to microprocessor 18 and after being digitized is compared with the stored value. The result of the comparison controls indicator 20 having preferably five light emitting diodes. Taking a temperature reading is performed by the microprocessor for instance 16 times a second, in order to "constantly" monitor warming up of heat source 12 after it has been activated. The outputting of the results of the monitoring is arranged in such a way as to succesively set into operation subsequent LEDs as the temperature of a heat source increases. Specifically, each subsequent LED of LEDs 22–30 is preferably switched on with a temperature rise of 2° F. which can be referred to as a predetermined quantity characterising one aspect of the functionality of the heat source. When the temperature rise exceeds 10° F., switch 32 changes a ten-degree range to the next level. For foreseeable practical purposes, more than ten of such ten-degree ranges are unlikely to be needed.

Figure 2:
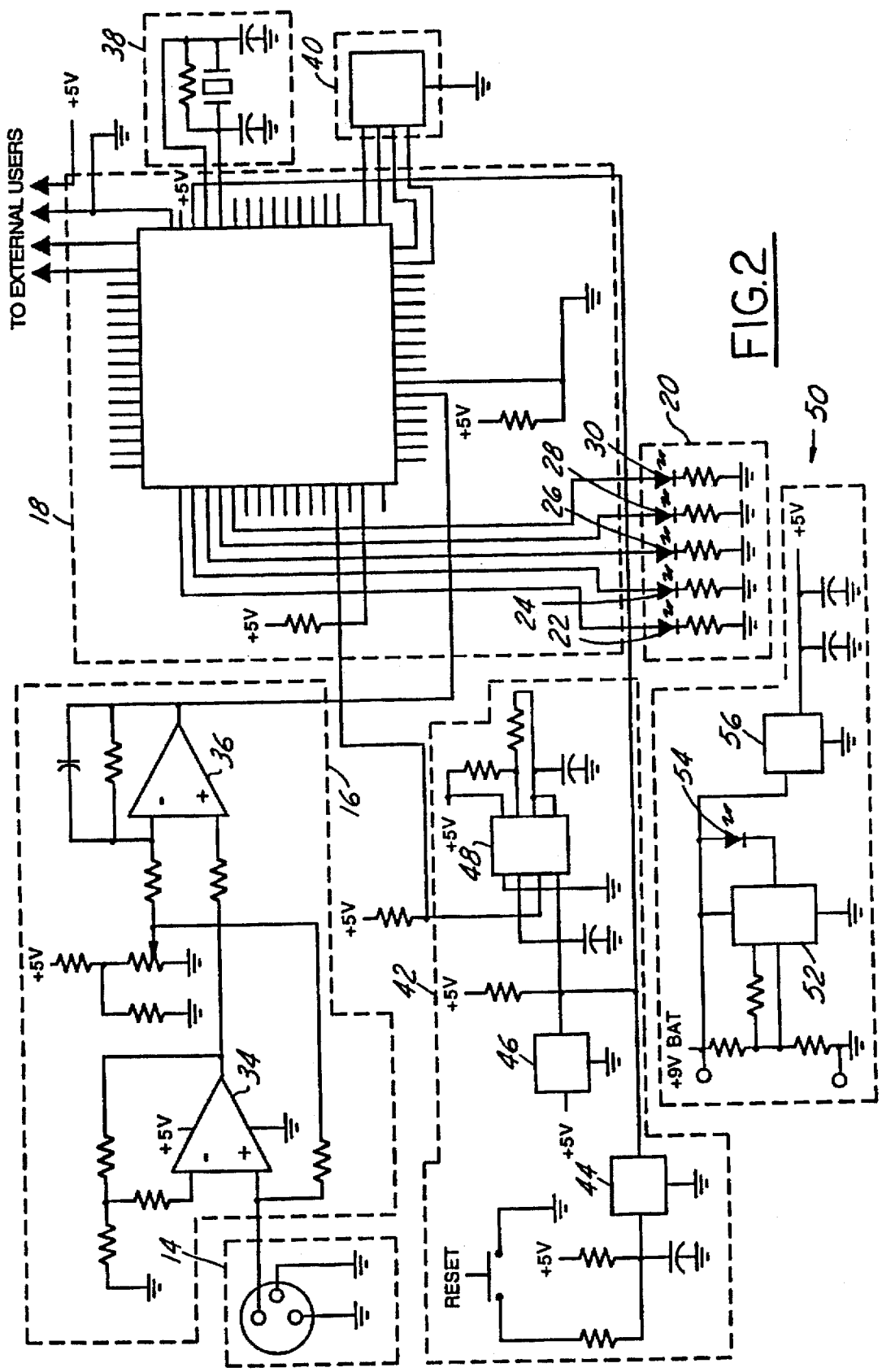
FIG. 2 is a schematic diagram of the preferred embodiment of the detector designed according to the present invention.

A preferred embodiment of the detector disclosed in general in FIG. 1 is shown in FIG. 2. For infrared sensor 14, a commercially available Model M2 thermopile sensor of Dexter Research Center, Inc., is preferably used. The M2 model includes a long pass silicon window that is 6 to 14 µm thick. Sensor 14 controls amplifier-filter 16 shown in FIG. 2 as two operational amplifiers 34 and 36. A known at the market CMOS dual operational amplifier of LMC662CN type produced by Digi-Key, with a gain factor of about 100, is preferably used for that amplification and filtering purpose. The output signal of amplifier-filter 16 is applied to microprocessor 18. One possible implementation of microprocessor 18 is a Motorola, Inc., CMOS microprocessor chip of MC68HC11KA4BCFN4 type.

After microprocessor 18 has performed a comparison of values characterising the ambient temperature and a temperature of heat source 12 (not shown in FIG. 2), the result of the comparison controls indicator 20 having for example five light emitting diodes, for which Digi-Key's LEDs of P372, 373, 375 types are preferably used. The output signal from microprocessor 18 can also be directed to an external user which may be an external computer terminal, printer, or the like.

Repeatedly taking a temperature reading is made possible by means of a resonator 38 connected in microprocessor 18. In one embodiment, the Murata, Ltd.'s 16 MHz ceramic resonator of CST16.00MXW040 type is used for that purpose.

To increase accuracy in the microprocessor's operation, a sensitivity control unit 40 is coupled to microprocessor 18. Different thresholds for measuring voltages with necessary accuracy can be specified with the aid of unit 40. To this end, a BCD switch of 350102GS type manufactured by EECO is used for the illustrated embodiment.

Microprocessor 18 is equipped with a manually operated reset circuit 42 intended specifically to empty the microprocessor's inner memory at preselected times. For the embodiment shown in FIG. 2, circuit 42 comprises two Motorola's low voltage sensors 44, 46 of the MC34164P-5 type and a Digi-Key's 555 CMOS timer, 48, of the ICM555IPA-ND type.

Power supply unit 50 provides the detector with +5 V voltage and includes a low battery detector 52 with a LED indicator 54, and a voltage regulator 56. Digi-Key's products are preferably used for implementing power supply 50; a low battery detector of the MAX8211CPA-2-ND type for unit 52, a micropower 5 V voltage regulator of the LP2950ACZ-5.0-ND type for unit 56, and an orange LED of the P373 type for indicator 54.

Odd-shaped and irregular structure heat sources are sometimes encountered, which may have a configuration of alternating ambient and over-ambient temperature portions. A rear defroster in a vehicle is one example of such a source. To deal with the source of the shape mentioned, a counting circuit (not shown) within microprocessor 18 is activated. When sensor 14 is being transferred, by virtue of a scanner (not shown) or manually, across the rear defroster, sensor 14 is supposed to succesively meet "strips" of ambient temperature interspersed with heated "strips". The number of temperature differences registered by means of the counting circuit enables the inventive system to determine whether all portions of the rear defroster are working.

For example, assume s rear defroster having twelve heating strips. When the sensor passes along the rear window in a direction perpendicular to the strips, the counter (not shown) registers the number of heated regions that are encountered. This number corresponds to the number of functional rear defroster elements. If that number is less than twelve, a system operator realizes that the tested rear defroster has some malfunctioning elements.

Figure 3:
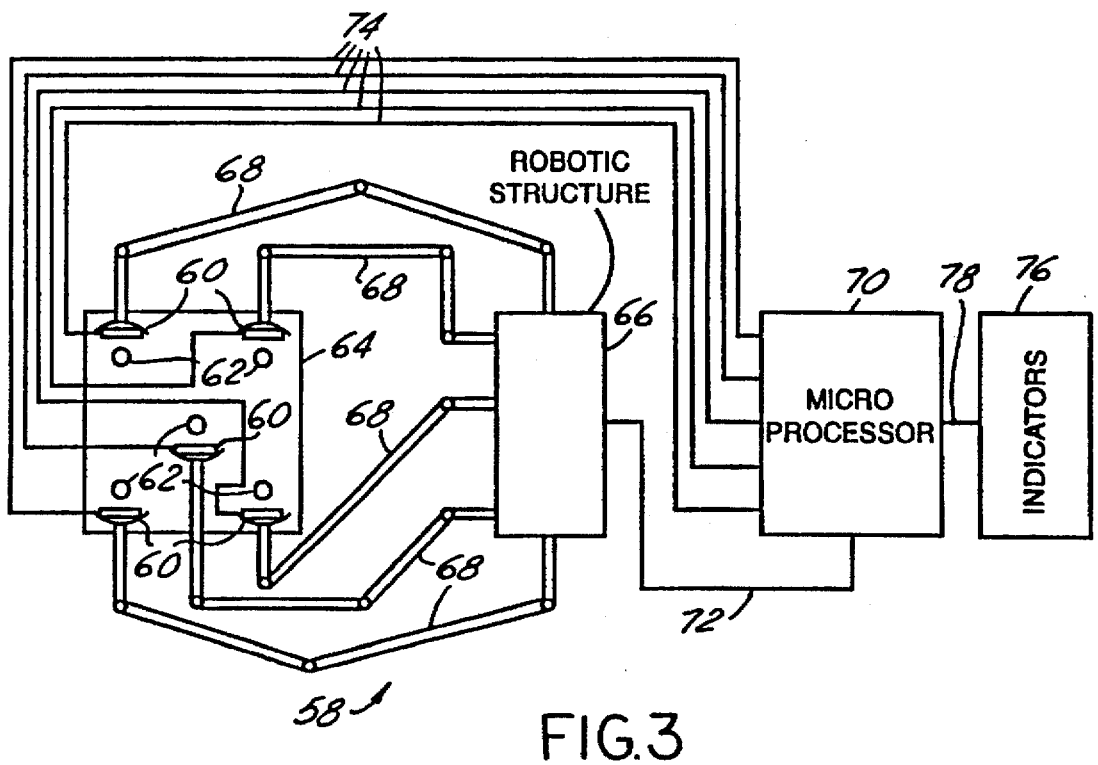
FIG. 3 is a schematic view of a non contact system designed according to the present invention for testing serviceability of a plurality of heat sources.

FIG. 3 exemplifies a system for testing the functionality of a plurality of heat sources which preferably belong to one object of interest. The depicted system 58 comprises a plurality of heat detectors 60 of the type shown in FIG. 1 and described above in connection therewith. Detectors 60 are intended to sense heat radiation emanating from heat sources 62 arranged on object 64. Moving and transferring heat detectors 60 is executed by means of a conventional robotic structure 66 equipped with arms 68, each arm 68 being responsible, for convenience, for transferring a respective one of the detectors 60. Robotic structure 66 is controlled by a conventional microprocessor 70 over a line 72. In turn, microprocessor 70 receives information from heat detectors 60 over connections 74, and this information, after having been independently processed in accordance with the procedure described above as per a single detector, is output to an indicator unit 76 over a line 78. Indicator unit 76 displays the results of testing either serially for each detector, or in parallel, as the particular application may require.

The above system can be applied to different objects. It is not difficult to imagine, for example, some power equipment inhomogeneously heated in operation which can be fraught with geometrical distortions and developing stresses. Timely discovering malfunctions in such equipment can be easily and conveniently performed with the aid of the system according to the present invention.

Figure 4:
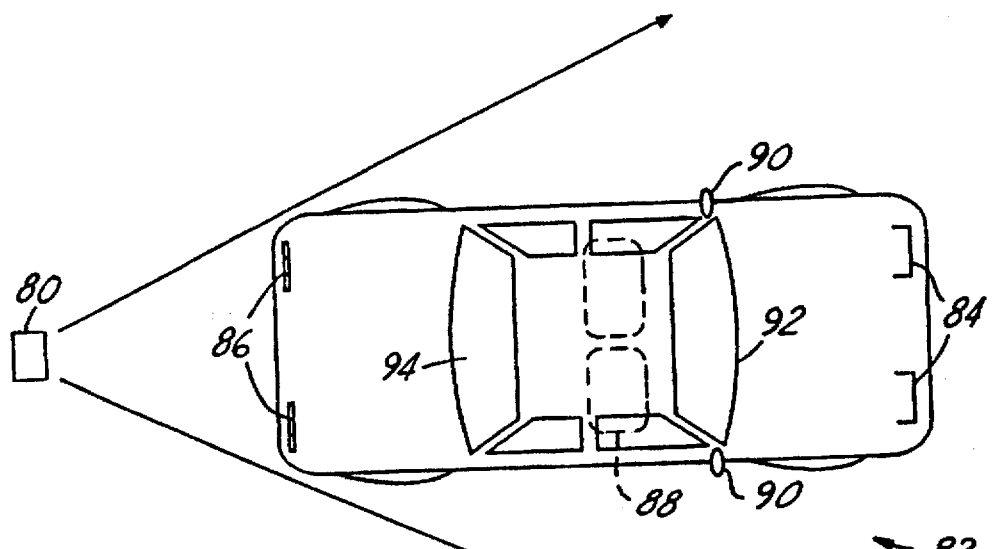
FIG. 4 is a top view of a car as a subject for a system according to the present invention.
Figure 5A:
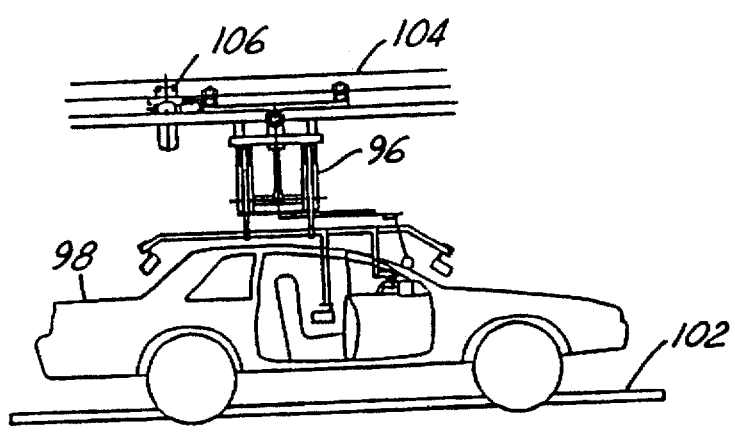
FIGS. 5A, 5B, and 5C together yield a three-view schematic illustration of a system according to the present invention shown evaluating heated components of a car.
Figure 5B:
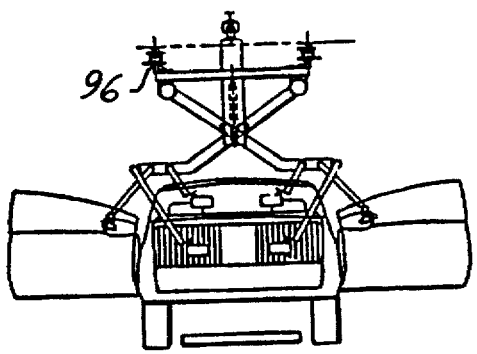
Figure 5C:
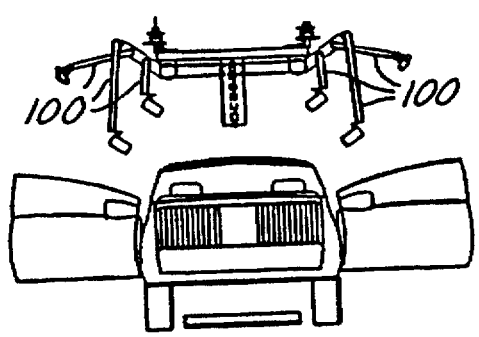

FIG. 4 shows a thermal detector 80 with a sensor symbolically embracing a car 82 having a number of heat sources, such as lights (head, 84, and tail, 86), seats 88, outside mirrors 90, windshield 92 and rear window 94. Cars can also be subjects of application for the system in question. In more detail, this application is illustrated by FIGS. 5A–C in which a schematically depicted robotic structure 96 of the system is shown testing a car 98. For simplicity, it is a coupe represented in the 5A and 5B views with arms 100 of robotic structure 96 put in operational positions inside and outside the car, whereas FIG. 5C pictures structure 96 with arms 100 in a retracted position. For testing, car 98 can be automatically or under its own power placed on a stand 102, and robotic structure 96 is conveyed to it along a track 104 with the help of a tracking motor 106. For the sake of simplicity, heat detectors, s microprocessor, and an indicator are not specifically illustrated.

Now, that the heat difference detector and the system for testing functionality (serviceability) of heat sources using the detector are set forth in their respective preferred embodiments, a description follows of a method for testing serviceability of a source of heat exploiting one thermal difference detector of the disclosed type, or a plurality of such detectors combined in the system illustrated hereinbefore. According to the present invention, the method includes pointing sensor 14 at a source having ambient temperature, obtaining a first electrical signal corresponding to the ambient temperature, processing the first signal and storing it to obtain a reference level for further testing. Also, a source 12 of heat should be activated and, after pointing sensor 14 at this source, a second electrical signal responsive to the temperature of the source of heat is obtained. This magnitude undergoes amplification and filtration in unit 16, then is digitized and processed in a processing means (microprocessor 18). It is next compared to the stored value corresponding to the ambient temperature. Eventually, a judgement of the serviceability of the source can be made based on the difference between the measured magnitude and the ambient temperature value.

In case there is more than one source of heat whose serviceability is to be tested, s respective quantity of detectors is preferably provided, and the described sequence of steps is performed regarding each source. Also, for better results, taking the magnitude can be carried out repeatedly, at a predetermined rate which is preferably 16 times a second. When s source of heat has a complex structure, with portions radiating heat interspersed with portions having ambient temperature (a conventional rear window defroster, for example), a scanning step is performed obtaining the second electrical signals and the processing stage includes counting the number of heat differences during the scanning to make sure that all elements of the heat source structure are in order.

While several embodiments of the present invention have been disclosed hereinabove, it is to be understood that these embodiments are given by example only and not in a limiting sense. Those skilled in the art may make various modifications and additions to preferred embodiments chosen to illustrate the invention without departing from the spirit and scope of the present contribution to the art. For examples more than ten ten-degree ranges for switch 32 can be provided, taking a value of an electrical parameter responsive to the ambient temperature can be performed in the method in question after the similar operation with the source of heat, etc. Accordingly, it is to be realized that the protection sought and to be afforded hereby shall be deemed to extend to the subject matters claimed and all equivalents thereof fairly within the scope of the invention.

What is claimed is:

1. A method for testing the serviceability of a heat source comprising the steps of:

producing an ambient temperature signal corresponding to an ambient temperature;

storing an ambient value corresponding to the ambient temperature signal;

detecting thermal radiation from a heat source;

producing a temperature signal corresponding to a temperature associated with the detected radiation;

amplifying and filtering the temperature signal;

sampling and digitizing an instantaneous value of the temperature signal;

comparing the digitized instantaneous value to the ambient value;

successively sampling a plurality of digitized instantaneous values;

repeating the sampling and digitizing step to obtain subsequent digitized instantaneous values and further comparing each subsequent digitized instantaneous value against the ambient value to substantially continuously evaluate a measure of increasing heat associated with the detected radiation;

displaying a result of the first comparison; and consecutively displaying results of the further comparisons, to thereby indicate the serviceability of the source of heat.

2. A method for testing a heat source as recited in claim 1, further comprising the step of changing a temperature range switch having a plurality of temperature settings from an initial setting in equal increments to the next setting when the instantaneous value rises a predetermined increment.

3. A method for testing a heat source as recited in claim 1, wherein the step of detecting thermal radiation comprises the subject of directing a thermal difference detector at the heat source.

4. A method for testing a heat source as recited in claim 1, wherein the step of sampling and digitizing comprises the sub-step of repeating the sampling step at a predetermined rate to obtain the instantaneous value of the temperature signal.

5. A method for testing a heat source as recited in claim 1, wherein the heat source has alternating heated portions and unheated portions, said method further comprising the steps of scanning the heat source with a sensor which produces the temperature signal; and determining a number of temperature differences across said heat source by repeating the steps of producing a temperature signal corresponding to a temperature associated with the detected radiation, amplifying and filtering the temperature signal, sampling and digitizing an instantaneous value of the temperature signal, comparing the digitized instantaneous value to the ambient value, successively sampling a plurality of digitized instantaneous values, repeating the sampling and digitizing step to obtain subsequent digitized instantaneous values and further comparing each subsequent digitized instantaneous value against the ambient value to substantially continuously evaluate a measure of increasing heat associated with the detected radiation.

* * * * *